United States Patent [19]
Lustig et al.

[11] Patent Number: 5,981,690
[45] Date of Patent: Nov. 9, 1999

[54] POLY(ALKYLENE ARYLATES) HAVING IMPROVED OPTICAL PROPERTIES

[75] Inventors: Steven Raymond Lustig, Landenberg; Robert Ray Burch, Exton, both of Pa.

[73] Assignee: E. I. du Pont de Nemours and Company, Wilmington, Del.

[21] Appl. No.: 09/292,426

[22] Filed: Apr. 15, 1999

Related U.S. Application Data

[63] Continuation-in-part of application No. 09/062,461, Apr. 17, 1998.

[51] Int. Cl.$^6$ ................................................ C08G 63/78
[52] U.S. Cl. ......................... 528/279; 528/283; 528/286; 524/709; 524/783; 524/789; 525/444
[58] Field of Search .................................. 528/279, 283, 528/286; 524/709, 783, 789; 525/444

[56] References Cited

U.S. PATENT DOCUMENTS

| | | | |
|---|---|---|---|
| 4,254,011 | 3/1981 | Bier | 524/513 |
| 4,276,208 | 6/1981 | Ogawa et al. | 523/217 |
| 4,399,244 | 8/1983 | Bier | 524/89 |

*Primary Examiner*—Samuel A. Acquah

[57] ABSTRACT

Poly(alkylene arylates) having excellent optical properties are disclosed and can be prepared using an organic titanate-ligand catalyst solution containing organic silicates and/or zirconates and, preferably, certain phosphorus compounds.

22 Claims, No Drawings

POLY(ALKYLENE ARYLATES) HAVING IMPROVED OPTICAL PROPERTIES

This is a continuation-in-part of application Ser. No. 09/062,461 filed Apr. 17, 1998, now pending.

BACKGROUND OF INVENTION

1. Field of Invention

This invention relates to poly(alkylene arylates), such as poly(ethylene terephthalate), PET; poly(propylene terephthalate), PPT; poly(butylene terephthalate), PBT; poly (ethylene naphthalate), PEN; poly(propylene napthalate), PPN; poly(butylene naphthalate); poly(ethylene isophthalate), PEI; poly(propylene isophthalate), PPI; poly (butylene isophthalate), PBI; homopolymers and their copolymers and mixtures, containing the residue of organic titanate-ligand catalyst systems. The poly(alkylene arylate)s possess better optical properties than similar polymers heretofore made with other organic titanate-ligand catalysts. Resulting PET, for example, is particularly useful in preparing transparent articles, such as films, that have excellent clarity, reduced light scattering and absorb less light than conventional PET. Thus, PET resins made with the catalyst have particular utility as the substrate for x-ray and photographic films.

2. Description of Related Art

Poly(ethylene terephthalate), PET, is a widely used polyester typically manufactured by two routes: (1) transesterification of a dialkyl terephthalate ester (e.g., dimethyl terephthalate) with ethylene glycol to form an intermediate bis-2-hydroxyethyl terephthalate, followed by polycondensation to form the PET; or, (2) by direct esterification of terephthalic acid with ethylene glycol, followed by polycondensation to form PET. A catalyst is commonly used to speed the reaction in either case. The same or different catalyst may be selected for the transesterification and polycondensation steps.

Many commercial processes use manganese or zinc salts as the catalyst for the transesterification step. Antimony, in the form of a glycol solution of antimony oxide, typically is used as the polycondensation catalyst in either the transesterification or direct esterification processes outlined above. There is an interest in replacing antimony with another catalyst, however, since insoluble antimony species tend to be formed which increase the polymer darkness, scatter light, and interfere with spinning or other forming. Furthermore, antimony catalysts have come under increasing regulatory pressure. Thus, there is a need for new polycondensation catalysts that reduce or replace antimony in the manufacture of PET and other poly(alkylene arylate)s.

Organic titanates, such as tetraisopropyl and tetra n-butyltitanates, are known to be effective polycondensation catalysts for preparing poly(alkylene arylates) in general, and frequently are the catalyst of choice in the manufacture of polybutylene terephthalate (PBT) because of their higher reactivity than conventional antimony catalysts. Organic titanates are not generally used in the manufacture of PET, however, because residual titanate catalyst tends to react with trace impurities formed during the polycondensation and processing of PET (e.g., aldehydes), generating yellow discoloration that cannot be tolerated in products typically fabricated from PET (e.g., x-ray and photographic films, bottles, and packaging film).

Lack of glycol solubility also is a practical limitation for most organic titanate catalysts. It is preferred to add catalyst to a continuous polycondensation reaction as a dilute glycol solution (rather than a dispersion) to obtain uniform distribution of the small quantities of catalyst that are employed. Organic titanates typically form a precipitate when added to a glycol, which tends to complicate manufacturing control and introduces product quality problems due to non-uniform distribution of catalyst in the reaction mass.

Numerous binary compositions containing organic titanates and phosphorus compounds (organic and inorganic) have been proposed in the technical and patent literature for use as a polycondensation catalyst in the manufacture of poly(alkylene arylates). For example, it has been proposed to add phosphoric acid, or other phosphorus based compounds, along with organic titanates to control color by complexing the residual titanate catalyst. The use of such strong complexing agents, however, invariably reduces efficiency of the titanate catalyst and introduces polymerization control problems. Thus, there is an ongoing need for a non-antimony based polycondensation catalyst that is glycol-soluble, efficient, and produces poly(alkylene arylates) in general, and PET and PPT in particular, having excellent optical properties.

SUMMARY OF THE INVENTION

The present invention provides a more useful and attractive form of poly(alkylene arylates), such as PET and PPT, that are polymerized using an organic titanate-ligand catalyst. The polymer has low visible reflective color and can be either pressed, extruded or otherwise formed into an article, such as a film, in a way such that the article has high light transmissivity between wavelengths 320 nm and 800 nm. The polymer can be prepared using an organic titanate-ligand catalyst system that can (1) be soluble in the reaction mixture, (2) be soluble in the alcohol used in preparing the polymer, (3) provide high rates of polymerization in the reaction mixture, (4) include cocatalysts or supplementary additives to the polymer which help prevent the formation of titanate chromophores, or (5) prevent or greatly reduce the formation of chromophores. The term "organic titanate-ligand catalyst" as used herein refers to a catalyst deriveable from or containing an organic ortho titanate with ligands and cocatalysts that may prevent the formation of titanate chromophores, such cocatalysts can comprise organic silicates, organic zirconates and organic phosphors.

DETAILED DESCRIPTION OF THE INVENTION

The poly(alkylene arylate) polymer of the present invention can be a homopolymer or a copolymer. The term "poly(alkylene arylate)" is referred to a polymer having repeat units derived from at least one methylenic monomer or comonomer containing aromatic carboxylic group. The term "copolymer" used herein include a polymer comprising repeat units derived from two or more comonomers. Any comonomers containing a polymerizable ethylenic structure such as, for example, ethylene, propylene, hexene, decene, can be used to produce the polymer.

Organic titanates are well known to promote rapid polycondensation rates in the preparation of poly(alkylene arylates). Organic titanates are generally not used commercially for this purpose when optical properties are important such as in many of the commercial products fabricated from PET, PEI, PPT, and PBT, however, because the organic titanates tend to cause unacceptable color formation and light absorption. While this invention applies generally to poly(alkylene arylates), it now will be described in detail with respect to PET, a preferred embodiment.

Without being bound by theory, degradation by-products inevitably are produced in small quantities during the polymerization and processing of PET. These by-products (e.g., aldehydes, especially acetaldehyde) form chemical complexes with catalyst residues (i.e., titanates) that generate discoloration in, and absorb light passing through, the PET. Thus, the PET is not suitable for consumer applications because it is not attractive, or for applications such as photographic or x-ray film substrates because the complexes detract from desired image resolution and imaging sensitivity. These optical properties include two phenomena: (1) how the PET reflects light; and (2) how PET absorbs light being transmitted through it.

The organic titanate-ligand catalyst decreases or eliminates the combination of the organic titanate with polymerization by-products (e.g., aldehydes), thereby reducing or eliminating absorbance of light in the polymer at ultraviolet and visible wavelengths of 320 nm to 800 nm. Without being bound by theory, the ligand(s) prevent(s) the formation of titanium complexes that detract from desired optical properties, and/or forms complexes with the by-products that do not detract from the desired optical properties. The organic titanate-ligand catalyst system may include a cocatalyst which provides alternative sites for the by-products and the combined cocatalyst and by-products are not chromophores.

According to the present invention, the poly(alkylene arylate) has a weight average molecular weight of at least 21,000 Daltons and containing between 0.1 and 500 ppm organic titanium-ligand catalyst residue. The poly(alkylene arylate) can have an ABS/AL value from 0 to less than or equal to 6.1, preferably less than or equal to 6, and more preferably less than or equal to 5, and even more preferably less than or equal to 4. The polymer can have a Hunter L value greater than 65, preferably greater than 75, a Hunter a value between −2 and +2, preferably about zero, and a Hunter b value between −2 and 6, preferably about zero. Alternatively, the polymer can have a combination of a weight average molecular weight of at least about 21,000 containing about 0.5 to 500 ppm titanium residue from an organic titanate-ligand catalyst solution, an ABS/L value of less than 7, a Hunter L greater than 65, a Hunter a value between −2 and +2, and a Hunter b value between −2 and 8.3. Further alternatively, the polymer can have the combination of a weight average molecular weight of at least about 21,000 and containing between 0.5 to 500 ppm titanium catalyst residue, an ABS/L value less than 7, a Hunter L greater than 65, a Hunter a value between −2 and +2, and a Hunter b value between −2 and 6. The catalyst residue (between 0.1 and 500 ppm) refers to the presence of elemental titanium in parts per weight per million parts by weight polymer, and does not include any particulate titanium dioxide compounds that may be present for other reasons. Quantity of titanium catalyst residue is conveniently determined by elemental analysis or spectroscopy.

REFLECTED LIGHT

Polymer color conventionally is evaluated by measuring the intensity of light reflected at various wavelengths when the polymer is exposed to a broad-spectrum light source using an instrument such as a spectrophotometer. The techniques generally are described in *The Measurement of Appearance*, R. S. Hunter and R. W. Harold, $2^{nd}$ ed., Wiley Publishers, New York (1987); and *Color Science: Concepts and Methods, Quantitative Data and Formulae*, G. Wyszecki and W. S. Stiles, $2^{nd}$ ed., Wiley Publishers, New York (1982). Color can be measured and reported by specifying the three numerical values of L, a and b in the Hunter color scale. The L-value represents whiteness or shade of gray; the greater the numerical value, the higher the whiteness. The L-scale's upper limit is 100 which denotes white in the absence of hue and the L-scale's lower limit is zero which denotes black. The a and b values indicate the intensity of hue or tint. When both a and b values are zero the material is a shade of gray, or is said to have neutral hue. A positive value of a denotes redness and a negative value of a denotes greenness. A positive value of b denotes yellowness and a negative value of b denotes blueness.

The physical form of the poly(ethylene terephthalate) polymer influences the numerical values of the L, a and b color numbers as measured by a spectrophotometer in reflectance mode. Polymer in the form of thin fiber or small powder particle size or rough surface shape reflects more light than respective thicker fiber or large powder particle size or smooth surface. Thus a sample of the former shape type will have higher whiteness and more neutral hue than a sample of the latter shape type if the chemical composition of the samples is identical. Crystalline polymer reflects more light than less crystalline or amorphous polymer. Thus a more crystalline sample will have a higher whiteness and more neutral hue than a more amorphous sample if the chemical composition of the samples is identical. Thus when comparing the reflected color of polymer samples which differ by catalyst composition, it is useful to ensure the physical shape and form are very similar to assess the advantages of particular catalyst systems.

A color measurement method may capture only light reflected from the polymer or a measurement can capture light which is both reflected from and transmitted through the polymer. Examples of the former case includes incident light reflected from the surface of polymer fibers or ground polymer flakes or powder particles. Examples of the latter case includes light which is incident on a stack of films such that some of the light reflects directly from the outer surface of the first film while some light transmits through some layers and are reflected out of the films by interior interfaces within the film stack. The latter color measurement method is not preferred by the inventors because some light wavelengths can be absorbed and/or transmitted by the polymer, thus the L, a, b values do not provide a pure indication of the colored light only reflected by the polymer surface.

Hunter color values recited herein are determined in accordance with the following procedure, as illustrated in the Examples. A specific sample preparation is used to measure and compare reflective color from several PET samples differing by catalyst composition. A PET sample is first crystallized to at least 20 weight percent crystallinity, typically 30 weight percent, by annealing in an oven at 160° C. for 16 hours. Then the sample is ground to a fine, uniform powder using a Wiley Mill grinder (model ED-5 obtained through Thomas Scientific, PO Box 99, Swedesboro, N.J. 08085) which grinds the polymer so that the particles can fit through a mesh spacing of 2 millimeters. This ground powder is then placed in a spectrophotometer to measure color in a pure reflectance mode.

Typical PET resins employed for photographic or x-ray films, packaging applications, bottles, and the like have an L value of at least 65. Typical PET resins made using an antimony catalyst will have a and b values in the range between −2 and +2. It is preferred to have L values close to 100 and to have a and b values close to zero.

ABSORBED LIGHT

PET has a strong absorbance band for light having a wavelength ($\lambda$) near 310 nm. For many applications, such as x-ray and photographic films, it is important that the PET absorb little, or no, light at wavelengths in the band of 320 to 800 nm due to presence of other materials (e.g., catalyst complexes) in the PET. There is no conventional technique for reporting the light absorbance property of a transparent polymer, although the underlying theory of measuring light absorption is well known in the art. Representative references discussing light absorption, that may be consulted in understanding the formula developed below, are *Mechanism and Theory in Organic Chemistry* by T. H. Lowry and K. S. Richardson, Harper & Row Publishers (1976); *Physical Chemistry*, by W. J. Moore, Prentice Hall Publishers, $4^{th}$ ed. (1972); and *Physical Methods in Chemistry*, by R. S. Drago, Saunders Publishers (1977).

Absorbed light values (ABS/L) recited herein are determined in accordance with the following procedure, as illustrated in the Examples. A specific sample preparation method is used to measure and compare light absorbances from several PET samples differing by catalyst composition. A PET sample is first melt pressed into film typically 10 mils thick between two plates of metal. The film and metal plates are quenched in cold water before the polymer can crystallize substantially. The measured crystallinity is less than 5 weight percent, typically 3 weight percent. The resulting films are visibly transparent. The film is removed from the plates and placed in a spectrophotometer for light absorption measurement. Using a spectrophotometer, the light absorption within the film is measured by comparing the intensity of light transmitted through the thin dimension of the film relative to the original light intensity incident normal to the plane of the film. The absorbance, A, at a wavelength, $\lambda$, is defined as $$A(\lambda) = \ln\left(\frac{I_o(\lambda)}{I(\lambda)}\right)$$

where $I_o$ is the incident light intensity and I is the intensity of light which has transmitted through the film and ln( ) is the logarithm with the base e, or natural logarithm.

According to the Beer-Lambert Law, the absorbance is proportional to the polymer film thickness, L, and the concentration of any materials present in the film that may absorb light. Thus the quantity $A(\lambda)/L$ indicates the amount of absorbance per unit film thickness which is dependent only on the composition within the film and independent of the film thickness.

Spectral data is provided with background correction so $I_o(\lambda)$ is unity. Intensity is provided in terms of percent (%) of light transmitted through the film. Thus, absorbance per unit film thickness is determined in accordance with the formula:

$$\frac{A(\lambda)}{L} = \frac{\ln\left(\frac{100}{I(\lambda)}\right)}{L}$$

Since pure PET itself has strong absorbance band near the 310 nm wavelength, the films have practical use where transmission in longer wavelengths in the ultraviolet and visible spectrum; i.e., at wavelengths of 320 to 800 nm. One useful means to measure and report the absorbance of light over the useful range is to integrate the absorbance per unit thickness throughout the spectrum of useful wavelengths. There is no standard way to report the film absorption over these wavelengths, so the inventors choose an unweighted integration over the wavelengths 320 nm to 800 nm. This property of the film, defined herein as ABS/L, is represented by the formula:

$$ABS/L = \frac{\int_{320\,nm}^{800\,nm} d\lambda \ln\left(\frac{100}{I(\lambda)}\right)}{L(800 - 320\,nm)}$$

where the thickness is provided in mils, or thousandths of an inch. It is noted that this property is not a measurement of color or darkness. It is a total measure of how much light does not go through the material. However, when ABS/L is very close to zero, then the material will be clear and uncolored. It is also noted that this property applies to regions of light which are invisible, roughly between 320 nm and 400 nm. Light absorbance confined between 320 nm and 400 nm is outside the common definition of visible light and would not be characterized by either the Hunter L, a and b color scale or any other description of visible color or visible transparency.

Typical commercial PET films used as the substrate for x-ray or photographic films have an ABS/L value less than 15. It is preferred for films to have an ABS/L value close to zero. Antimony catalyst is the catalyst of choice currently used to prepare those PET films. In practicing the invention, the advantages of organic titanate catalysts may be realized, while achieving color and ABS/L performance comparable or superior to that obtained with antimony catalyst.

PET PREPARATION

PET films and articles of this invention are made by the transesterification or direct esterification process mentioned above, using conventional melt or solid state techniques, but using the catalyst system described below in lieu of, or as a partial replacement for, the conventional antimony or other prior art polycondensation catalyst.

The catalyst system is soluble in ethylene glycol, has a high degree of activity for polycondensation, and results in polymer having improved optical properties (e.g., less unwanted color, less absorbed light, and less scattered light) compared to polymer obtained using an organic titanate catalyst alone, or organic titanate catalyst systems disclosed in the prior art. The catalyst system is prepared by adding an organic titanate, a compound that will provide the ligands (such as an organic silicate and/or an organic zirconate), and preferably an organic phosphoric and/or phosphoric acid, to the selected alcohol. The alcohol that is selected typically will be the glycol employed in preparing the polyester (i.e., ethylene glycol for PET) for convenience in conducting the polymerization process. The polyester is produced in minimal temperature, to assist reducing thermal degradation by-products, and in an atmosphere with minimal oxygen, to assist in reducing oxidative degradation by-products, and in contact with materials of construction which minimally leach impurities into the reacting mixture. The polymer can be of any molecular weight, but it is currently preferred that the weight-average molecular weight be above 21,000, and most preferred above 44,000 Daltons. The polymer can also be prepared with comonomers which have at least one alcohol group or at least one acid group or both groups. The titanate catalyst concentration can be about 0.01 to 500 ppm, most preferrably 0.5 to 100 ppm.

ORGANIC TITANATE

Organic titanates that may be selected in practicing the invention have the general formula:

$Ti(OR)_4$ where R is a ligand group typically composed of carbon, oxygen, phosphorous, silicon and/or hydrogen. Typically each R ligand group can contain at least one carbon, preferably 3 or more. The presence of a halide, or of other active substituent, in the ligand group generally is avoided since such groups may interfere with catalytic reactions or form undesired by-products, which would contaminate the polymer. While different ligand groups may be present on the same titanium atom, generally they can be identical to facilitate synthesis of the titanate. In some cases, 2 or more Rs may be from a common compound chemically bonded together, other than at the titanium (i.e., a multidentate ligand and such as triethanolamine, citric acid, glycollic acid, malic acid succinic acid, ethanediamine). For a discussion of ligand denticity see for example F. Albert Cotton and G. Wilkinson, *Advanced Inorganic Chemistry*, 4th ed., Wiley-Interscience, 1980.

Organic titanates are commonly prepared by mixing titanium tetrachloride and the selected alcohol precursor in the presence of a base, such as ammonia, to form the tetraalkyl titanate. The alcohol typically is ethanol, n-propanol, isopropanol, n-butanol, or isobutanol. Methanol generally is not selected since the resulting tetramethyl titanate is insoluble in the reaction mass, complicating its isolation.

Tetraalkyl titanates thereby produced are recovered by first removing by-product ammonium chloride (e.g., by filtration), and then distilling the tetraalkyl titanate from the reaction mass. This process generally is limited to the production of titanates having $C_4$ or shorter alkyl groups since the higher temperatures required to distill longer chain titanates (e.g., tetra-2-hexyl titanate) cause some degradation of the titanate. Titanates having longer alkyl groups are conveniently prepared by transesterification of those having alkyl groups up to $C_4$ with longer chain alcohols. As a practical matter, the selected tetraalkyl titanate generally will have alkyl chains less than $C_{12}$ since solubility of the titanate tends to decrease, and fabrication cost tends to increase, as the number of carbons increases.

Representative Commercial organic titanates that may be selected to advantage include Tyzor® TPT (tetra isopropyl titanate), TBT (tetra n-butyl titanate), and TE (triethanolaminato isopropoxide titanate) available from E. I. du Pont de Nemours and Company, Wilmington, Del., U.S.A.

ORGANIC PHOSPHORUS COMPOUNDS

Organic phosphonic and phosphinic acids may be included in the organic titanate-ligand catalyst solution to block titanium sites that otherwise would be attached by materials such as phosphorous that typically are present in polymerization solution. If such materials are not present, however, there is no need to include these acids. Without being bound by theory, it appears that the conjugate base of the acid bonds to the organic titanate during preparation of the catalyst system.

The phosphonic and phosphinic acids have an alkyl or aryl group directly bonded to the phosphorus atom. Typically the alkyl group will be a lower alkyl group, having up to 3 carbon atoms, such as a methyl or ethyl group. If an aryl group is selected, it may be a phenyl or naphthyl ring. The alkyl and aryl groups may be substituted with substituent groups that do not unduly interfere with preparation of the catalyst system or subsequent reactions employing the catalyst. If phosphonic acid is selected, one of the two OH groups bonded to the phosphorus atom may be esterified, if desired. Esters of phosphinic acid generally will not effectively bind to the titanate, so will not be selected.

The organic phosphonic acids tend to be stronger chelating agents than the phosphinic acids, and may be selected for applications where a strong bond is desired between the phosphorus compound and the organic titanate. Phenyl phosphinic acid and diphenyl phosphinic acid have been found to provide an excellent balance between reaction rate and preventing color generation in applications wherein the catalyst system is used as a polycondensation catalyst for the preparation of PET.

ORTHO SILICATES AND ZIRCONATES

The organic titanate-ligand catalyst system contains a cocatalyst radical or ligand, typically added as an organic ortho silicate and/or zirconate, to improve color of polymer prepared with the catalyst system, and to promote solubility of the catalyst system in the glycol (i.e., to render the catalyst system glycol soluble). By "glycol-soluble" it is meant that essentially all of the titanium present in the catalyst system is dissolved in ethylene glycol, at room temperature, at catalyst concentrations that are desired for the particular application. Typically the components are selected to form a catalyst system that is dissolved in concentrations of at least 3 grams, preferably at least 5 grams, of catalyst per 100 grams of glycol, to minimize the amount of glycol introduced to the reaction employing the catalyst system. Sufficient glycol should be present, however, to enable effective control over the catalyst addition rate for process control purposes.

The organic ortho silicates and zirconates that may be selected to advantage have the structure $Si(OR)_4$ and $Zr(OR)_4$, respectively, and generally are prepared by introducing silicon tetrachloride or zirconium tetrachloride into an alcohol bath to replace the chlorides with alkyl groups from the alcohol, in the same manner as described above for preparing $Ti(OR)_4$. The R is a ligand group typically composed of carbon, oxygen, phosphorous, and/or hydrogen. The presence of a halide, or of other active substituent, in the ligand group generally is avoided since such groups may interfere with catalytic reactions or form undesired by-products, which would contaminate the polymer. While different ligand groups may be present on the same titanium atom, generally they will be identical to facilitate synthesis of the titanate. In some cases, 2 or more Rs may be from a common compound chemically bonded together, other than at the titanium (i.e., a multidentate ligand and such as triethanolamine, citric acid, glycollic acid, malic acid, succinic acid, ethylenediamine).

If an organic silicate is selected, R is an alkyl chain having 1 to 8 carbon atoms. Tetraethyl and tetra-n-propyl ortho silicates are representative compounds available from Silbond Company under the "Silbond" trademark. Tetraethyl ortho silicate is a preferred ingredient.

If an organic ortho zirconate is selected, R is an alkyl chain having 2 to 8 carbon atoms. Tetra n-propyl and tetra n-butyl ortho zirconate are representative organic zirconates available from E. I. du Pont de Nemours and Company under the "Tyzor" trademark. Choice of a particular ortho silicate or zirconate will vary with the particular reaction to be promoted. An ortho silicate is preferred over an ortho zirconate, however, since it has less of an effect on the condensation rate.

CATALYST PREPARATION

The catalyst system can be prepared in ethylene glycol. While the components may be added to the glycol in any order, it is preferred to first add the organic ortho silicate or zirconate, and then add the organic phosphinic or phosphonic acid since the organic silicate or zirconate will aid the phosphorus compound to dissolve. Generally the mixture is stirred, and it may be mildly heated (e.g., 40° C. to 45° C.) to completely solubilize the organic phosphonic or phosphinic acid. A minimum amount of the glycol is used (e.g., 10 to 20 moles per mole of organic titanate that will be added later) to facilitate the subsequent reaction between the organic phosphonic or phosphinic acid and the organic titanate. Presence of too much glycol serves no useful purpose, and unnecessarily increases the amount of glycol that is handled in the process.

The organic titanate then is added to the glycol solution containing the phosphorus compound and organic ortho silicate and/or zirconate, conveniently at ambient temperature as the solution is stirred. This addition typically is performed under an inert atmosphere, such as nitrogen, since organic titanate (e.g., tetraisopropyl titanate) reacts with the phosphorus compound, liberating a flammable alcohol (e.g., isopropanol). This reaction is exothermic, causing the glycol solution temperature to rise 10° C. to 30° C. (for the particular components noted above). Typically the organic titanate will be added, with stirring, over a period of 0.5 to 2 hours or more, then cooled to ambient temperature. The catalyst system then is ready for use.

Alternatively, the phosphonic or phosphinic acid can be reacted with the titanate to form a complex that can be isolated from the reaction by-product alcohol by filtration. The isolated complex can then be added to a mixture of the ortho silicate or zirconate in ethylene glycol.

Relative quantities of the components will vary with the selected compounds, but generally will be selected such that the molar ratio of P:Ti in the catalyst system is within the range of 1:1 to 4:1. Higher amounts of the phosphorus compound tend to cause an unacceptable decline in catalytic activity, while lower amounts tend to create an unacceptable level of polymer discoloration. The molar ratio of Si or Zr:Ti generally will be selected within the range of 1:1 to 4:1 since higher loadings of the silicate or zirconate tend to cause unacceptable loss of polymerization rate (with some color degradation), and lower loadings generally do not provide the desired level of glycol solubility. The molar ratio of P:Si or Zr generally will be greater or equal to 0.5:1 since the lower ratios typically cause unacceptable levels of PET discoloration.

Structure of the catalyst system has not been established. Based on the observed exotherm, however, it is believed that the components have reacted or complexed in some manner to form binary or tertiary composition(s), at least to some extent, that render the catalyst system especially useful as a polycondensation catalyst in the manufacture of PET.

POLYMERIZATION REACTION

Antimony compounds currently are the catalyst of choice for the polycondensation reaction that forms PET, by either the transesterification or direct esterification route. In accordance with the invention, the catalyst system described above is substituted in whole or part for the antimony catalyst to form PET having desired optical properties (i.e., no or acceptable levels of discoloration and reduced light absorption). The catalyst system efficiently promotes the polycondensation reaction at commercially required rates comparable to those achieved with conventional antimony catalysts. Because it can be glycol-soluble, the catalyst can be readily distributed uniformly throughout the reaction mass, minimizing production control problems and producing PET having uniform quality.

The catalysts are compatible with conventional esterification and transesterification catalysts (e.g., manganese, cobalt, and/or zinc salts) and may be introduced to the production process concurrent with, or following, introduction of the esterification catalyst. The novel catalysts also have been found to be effective in promoting the esterification reaction, and may be used as a substitute for some or all of the esterification catalyst as well as the polycondensation catalyst.

Quantities of the catalyst will vary with the selected process, but generally will be in the range of 0.01 to 2000 ppm titanium based on the weight of prepolymer in the polycondensation reaction mass. The preferred range selected in preparing PET is 10 to 200 ppm, typically 10 to 50 ppm. Other ingredients also may be present to enhance catalyst stability or performance.

The catalyst system is particularly useful in preparing PET having a weight average molecular weight of 21,000 or higher, typically employed in applications such as films, engineering and bottling resins, and fibers. Comonomers may be present, to modify the properties of the resulting PET copolymer. For example, comonomers can comprise diethylene glycol, dipropylene glycol, 1,3-propylene glycol, 1,2-propylene glycol, glycolic acid, isophthalic acid, 2,6-naphthoic acid, lithium sulfonated isophthalic acid.

While the invention has been described in detail with respect to PET, it also applies to other poly(alkylene arylates) where it is desired to use an alternative to antimony as the polycondensation catalyst, while still obtaining excellent optical properties.

Having described the invention, it will now be illustrated, but not limited, by the following examples.

EXAMPLES AND COUNTER EXAMPLES

All examples and counter examples were prepared identically except for the identity of the catalyst systems being added. A master batch of oligo(ethylene terephthate) had been previously prepared by esterifying terephthalic acid and ethylene glycol without a catalyst to a number average degree of polymerization of 16. Using a masterbatch of esterified oligomer helps to avoid loss of material due to sublimation during polycondensation and enhances reproducibility of experimental results. All examples and counter examples were prepared from quantities of this single master batch of this oligo(ethylene terephthalate). For each example and counter example a 1-liter resin kettle was provided with a Jiffy Mixer agitator rotating at 60 rpm, a thermocouple, condenser and nitrogen sweep. To this kettle was added 400 grams of oligo(ethylene terephthalate), 115 ml of ethylene glycol and then the catalyst system to be tested. The agitator was turned on and the temperature was increased to 275° C. over a period of 45 minutes. The contents were polymerized by holding under agitation at 275° C. and a pressure of 120 torr for 20 minutes, and at 280° C. and a pressure of 30 torr for an additional 20 minutes. The contents were then held under agitation at 280° C. and a pressure of 0.5 torr for a time sufficient to reach 15 oz-in (ounce-inches) torque as measured by an Electro-Craft Motomactic torque controller. The time in minutes for this step was recorded as the Finish Time and varied with the catalyst used. The polymer melt was then poured into a water bath to solidify the melt. A portion of the resultant solid was then annealed at 160° C. for 16 hours and ground to pass through a 2 mm filter for color measurements as previously described. A separate portion of the resultant solid was placed between to sheets of metal, melt-pressed to a thickness typically 7 mil (thousandths of an inch), quenched to an amorphous film for light absorption measurements as previously described.

The following Table of Examples and Table of Counter Examples provide an abbreviation for the catalyst system; the aforementioned Finish Time in minutes; the weight average molecular weight, Mw, as determined by size-exclusion chromatography in hexafluoroisopropanol solvent; the reflective Hunter L, a and b polymer color measurements of the ground powder portion as described previously; and the light absorbance per unit film thickness ABS/L for the film portion as described previously. The catalyst components added to each resin kettle were measured by weight in grams relative to the weight of oligo (ethylene terephthalate) masterbatch in grams expressed in parts per million, i.e., mg of catalyst entity per kg of oligomer. The Table of Examples and Table of Counter Examples report the weight of catalyst component in ppm of active element within the catalyst compound, such as ppm of titanium for a titanate compound, ppm silicon for a silicate compound, ppm zirconium for a zirconate compound or ppm phosphorous for a phosphor acid. Abbreviations for each compound are identified under the table where the compound is used.

Table of Examples

| Example | Catalyst System | Finish Time | Mw | L | a | b | ABS/L |
|---|---|---|---|---|---|---|---|
| 1 | 2.6 ppm Ti, Tyzor TE<br>80 ppm Zr, TPZr<br>1 ppm Si, TEOS<br>7 ppm P, $H_3PO_4$ | 100 | 34,400 | 67.9 | −0.5 | 5.1 | 6.0 |
| 2 | 1.3 ppm Ti, Tyzor TE<br>40 ppm Zr, TPZr<br>20 ppm Si, TEOS<br>7 ppm, $H_3PO_4$ | 175 | 27,800 | 74.0 | −0.7 | 5.1 | 6.1 |
| 3 | 8 ppm Ti, Ti(PhP)$_4$ | 150 | 25,600 | 69.4 | −1.9 | 9.2 | 3.9 |
| 4 | 8 ppm Ti, Ti(PhP)$_4$<br>40 ppm Zr, Zr(PhP)$_4$ | 120 | 25,300 | 70.3 | −1.7 | 8.6 | 4.3 |
| 5 | 5 ppm Ti, Tyzor TE<br>40 ppm Zr, Zr(Bu$_2$PHO) | 340 | 21,100 | 70.0 | −1.1 | 5.0 | 5.0 |
| 6 | 12 ppm Ti, ThF8954 | 145 | 24,600 | 76.7 | −1.3 | 6.4 | 5.3 |
| 7 | 12 ppm Ti, Tyzor TE<br>40 ppm Zr, Zr(Bu$_2$PHO) | 130 | 24,500 | 77.5 | −1.5 | 6.6 | 5.6 |

Tyzor TE is titanium(IV) (triethanolaminato)isopropoxide supplied commericially by E. I. du Pont de Nemours, Inc.
TPZr is tetra-n-propyl zirconate
TEOS is tetraethyl orthosilicate
$H_3PO_4$ is phosphoric acid
Ti(PhP)$_4$ is titanium(IV) tetra-phenylphosphinate salt
Zr(PhP)$_4$ is zirconium(IV) tetra-phenylphosphinate salt
Zr(acac)$_4$ is zirconium(IV) tetra(acetylacetonoate)
Zr(Bu$_2$PHO) is zirconium tetra(dibutyl phosphinate)
TLF8954 is a mix of Ti(OC$_3$H$_7$)$_3$[O$_2$P(OC$_4$H$_9$)$_2$] + Ti(OC$_3$H$_7$)$_2$[O$_2$(HO)P(OC$_4$H$_9$)]

Table of Counter Examples

| Counter Example | Catalyst System | Finish Time | Mw | L | a | b | ABS/L |
|---|---|---|---|---|---|---|---|
| 1 | 200 ppm Sb, Sb$_2$O$_3$ | 230 | 27,400 | 75.1 | −1.1 | 6.2 | 11.7 |
| 2 | 0.12% Ti(OBu)$_4$<br>0.032% Zr(OPr)$_4$ | 55 | 27,300 | 65.4 | −0.4 | 12.6 | 9.6 |
| 3 | 8 ppm Ti, Ti(OBu)$_4$<br>4.2 ppm Zr, Zr(OPr)$_4$ | 140 | 25,800 | 67.1 | −0.9 | 9.6 | 8.4 |
| 4 | 8 ppm Ti, Ti(OBu)$_4$<br>4.2 ppm Zr, Zr(OPr)$_4$<br>7 ppm P, $H_3PO_4$ | 160 | 26,700 | 69.0 | −1.2 | 11.3 | 8.6 |
| 5 | 8 ppm Ti, Ti(TEA)$_4$ | 125 | 27,200 | 72.9 | −0.8 | 9.4 | 6.1 |
| 6 | 8 ppm Ti, Ti(OiPr)$_4$ | 140 | 24,900 | 70.5 | −1.4 | 8.6 | 6.3 |
| 7 | 8 ppm Ti, Ti(OiPr)$_4$ | 130 | 24,900 | 71.2 | −0.8 | 8.4 | 6.5 |
| 8 | 8 ppm Ti, Ti(OiPr)$_4$<br>7 ppm P, $H_3PO_4$ | 185 | 27,200 | 70.3 | −1.3 | 5.9 | 6.2 |
| 9 | 8 ppm Ti, Ti(OiPr)$_4$<br>7 ppm P, $H_3PO_4$ | 220 | 24,800 | 71.7 | −1.0 | 6.2 | 6.4 |
| 10 | 98 ppm Ti(OAc)$_4$<br>1280 ppm ZrOCl$_2$ | 80 | 27,600 | 61.6 | −0.7 | 9.8 | 8.5 |
| 11 | 98 ppm Ti(OAc)$_4$<br>472 ppm ZrO(NO$_3$)$_2$ | 135 | 27,600 | 64.1 | 0.1 | 14.0 | 8.1 |
| 12 | 8 ppm Ti, Ti(OAc)$_4$<br>40 ppm Zr, ZrO(NO$_3$O)$_2$<br>7 ppm P, $H_3PO_4$ | 165 | 25,300 | 69.7 | −0.8 | 10.9 | 6.8 |
| 13 | 8 ppm Ti, Ti(OAc)$_4$<br>7 ppm P, $H_3PO_4$ | 100 | 28,600 | 68.1 | −0.8 | 12.3 | 7.5 |

-continued

Table of Counter Examples

| Counter Example | Catalyst System | Finish Time | Mw | L | a | b | ABS/L |
|---|---|---|---|---|---|---|---|
| 14 | 50 ppm Ti, TLF8954 | 135 | 24,500 | 75.2 | −1.4 | 5.5 | 6.3 |
| 15 | 8 ppm Ti, (PhP)$_4$ 40 ppm Zr, Zr(PhP)$_4$ 7 ppm P, H$_3$PO$_4$ | 110 | 25,700 | 71.6 | −1.4 | 6.4 | 6.5 |
| 16 | 1.3 ppm Ti, Tyzor TE 1 ppm Si, TEOS | 75 | 27,600 | 72.5 | −1.1 | 5.8 | 6.3 |
| 17 | 8 ppm Ti, Tyzor TE 40 ppm Zr, Zr(acac)$_4$ | 125 | 24,500 | 69.7 | −1.0 | 8.8 | 6.3 |

Sb$_2$O$_3$ is antimony trioxide
Ti(OBu)$_4$ is titanium(IV) tetra(n-butoxide)
Zr(OPr)$_4$ is zirconium(IV) tetra(n-propoxide)
H$_3$PO$_4$ is phosphoric acid
Ti(TEA)$_4$ is titanium(IV) tetrakis-triethanolamine
Ti(OiPr)$_4$ is titanium(IV) tetra(isopropoxide)
Ti(OAc)$_4$ is titanium(IV) tetra(acetate)
ZeOCl$_2$ is zirconyl dichloride
ZrO(NO$_3$)$_2$ is zirconyl dinitrate
Zr(acac)$_4$ is zirconium(IV) tetrakis(acetylacetonoate)
Zr(EDTA) is zirconium(IV) edetic acid salt
Zr(MBT) is zirconium(IV) mercaptobenzothiazole
Tyzor TE is titanium(IV) (triethanolaminato)isopropoxide supplied commericially by E. I. du Pont de Nernours, Inc.
TEOS is tetrethyl orthosilicate
Ti(PhP)$_4$ is titanium(IV) tetra-phenylphosphinate salt
Zr(PhP)$_4$ is zirconium(IV) tetra-phenylphosphinate salt
Zr(acac)$_4$ is zirconium(IV) tetra(acetylacetonoate)
TLF8954 is a mix of Ti(OC$_3$H$_7$)$_3$ [O$_2$P(OC$_4$H$_9$)$_2$] + Ti(OC$_3$H$_7$)$_3$[O$_2$(HO)P(OC$_4$H$_9$)]

Examples 1 and 2 illustrate the use of titanates, silicates, zirconates and oxy-phosphor compounds. The polymerization times are small to reach high molecular weight, and the final materials have low color (low values of Hunter a b) and absorb very little light (high Hunter L value and low ABS/L). This system illustrates excellent results for preferred polymer quality. Examples 3 and use a single organic titanate-phosphinate ligand catalyst system and a combination of organic titanate-phosphinate and organic zirconate-phosphinate, respectively. The polymerizations reach high molecular weight quickly and the products transmit light well, although the Hunter b color is high. Examples 5, 6 and 7 are further examples using other organic titanate, zirconate and oxy-phosphor compounds. Polymerization times are low to reach high molecular weight while the product color is low and the total light absorption within the films is low.

Counter Example 1 illustrates the typical performance of antimony catalyst at the concentrations typically used in commercial manufacturing. Although the Hunter b value is low, the Finish Time is long and the polymer films absorbs too much light (higher ABS/L).

Counter Examples 2 and 3 are counterexamples to the technology described in Hoeschele's patent [U.S. Pat. No. 5,120,822] and Schultheis [U.S. Pat. No. 3,326,965]. Compared to the examples of the invention, these materials are more yellow (higher b values) and absorb more light (higher ABS/L). Thus this use of titanates and zirconates is not as desirable as the examples. However, Hoeschele's patent specifically excludes consideration of titanates and zirconates for PET as the ethylene glycol repeat unit has 'vicinal' alcohols. Counter Example 4 illustrates that addition of phosphoric acid greatly extends the Finish Time without improving the Hunter b value or the film light absorbance. Findings from the use of titanates and zirconates with PET polymerization are not anticipated by the patents because we have learned (a) when phosphoric acid is added to a polymerizing mixture the titanium alkoxide catalysts are no longer highly active, and (b) zirconium alkoxides form gels in the ethylene glycol. Catalyst and cocatalyst systems employed in preparing poly(ethylene terephthalate) of the invention are soluble in ethylene glycol which permits convenient injection of the catalysts into the polymerizing mixture.

Counter Examples 5,6 and 7 are counterexamples to the technology described in Werber's patent [U.S. Pat. No. 3,056,818]. Counter Examples 8 and 9 illustrate this technology when phosphoric acid is added to the reaction mixture. Compared to the Examples, the polymerization times are longer as the catalyst is more deactivated when H$_3$PO$_4$ is added to the polymerizing mixture. The final materials absorb more light (higher ABS/L). Thus this use of titanates is not as desirable as the examples. Research provides the unanticipated result that Weber's titanium and/or zirconium catalysts are deactivated by even small amounts of metal scavengers, e.g., phosphoric acid, present during the polymerization. In addition no results including Ti+Zr are mentioned, nor is there mention of any advantage from the combination. Werber's claims include compounds which produce color and/or have only minute solubility in ethylene glycol. The Examples also quantify the surprising high reaction rate with the color and light transmission advantages from using oxy-phosphor containing ligands on the titanate and/or zirconate.

Counter Example runs 10 and 11 are counterexamples to the technology described in Hasegawa's patent [JP 46-27, 552]. Counter Examples 12 and 13 illustrate the effect of adding phosphoric acid to the reaction mixture. Compared to the Examples, the final materials are much more yellowed (higher Hunter b values) and absorb more light (higher ABS/L). Thus this use of titanates and zirconates is not as desirable as the examples. Hasegawa's findings do not mention color or light absorbance properties of the final material, only heat resistance. The titanate is restricted to a fatty acid salt of titanium and only titanium acetate is disclosed. Further, all zirconium compounds are restricted to zirconyls. The only Zr+P compound mentioned is zirconyl metaphosphate which is insoluble in ethylene glycol. The counterexamples show that the zirconyls have a detrimental effect on the final material's color and light absorbance properties.

Counter Example run 14 contains the same organic titanium-ligand catalyst system as Example run 6, except at more than four times the titanium concentration. The polymerization times, product molecular weights and colors are comparable, however the Counter Example run 14 absorbs much more light. Thus it is not useful in some critical applications.

Counter Example run 15 contains the same catalyst system as Example run 4 in the same relative concentrations with the addition of phosphoric acid. The polymerization times, product molecular weights and Hunter L, a colors are comparable. Although the Counter Example run 15 is much less yellow, it absorbs more light. The addition of phosphoric acid is known in the art to reduce color, but this comes at the price of increased light absorbance overall. Hence this Counter Example is not useful in some critical applications.

Counter Example runs 16 and 17 utilize the same organic titanate-ligand catalyst as in Example runs 1, 2, 5 and 7, except with different cocatalyst systems. In both cases high molecular weight is attained in small reaction times, so these are effective catalysts. The former run's product is substantially less colored, but both runs produce polymer which absorbs substantial amounts of light (high ABS/L). Therefore these products are not useful in some critical applications.

ADDITIONAL EXAMPLES

Example 8 Preparation of Poly(propylene terephthalate)

Oligo(propylene terephthalate) is prepared by esterifying terephthalic acid and 1,3-propylene glycol without a catalyst to a number average degree of polymerization of about 16. A 1-liter resin kettle is provided with a Jiffy Mixer agitator rotating at 60 rpm, a thermocouple, condenser and nitrogen sweep. To this kettle is added 400 grams of oligo(propylene terephthalate), 115 ml of propylene glycol and then an organic titanate-ligand catalyst system. The agitator is turned on and the temperature is increased to 255° C. over a period of 45 minutes. The contents are polymerized by holding under agitation at 255° C. and a pressure of 120 torr for 20 minutes, and at 255° C. and a pressure of 30 torr for an additional 20 minutes. The contents are then held under agitation at 255° C. and a pressure of 0.5 torr for a time sufficient to reach 15 oz-in (ounce-inches) torque as measured by an Electro-Craft Motomactic torque controller. The time in minutes for this step is recorded as the Finish Time and varies with the catalyst used. The polymer melt is then poured into a water bath to solidify the melt. A portion of the resultant solid is annealed at 160° C. for 16 hours and ground to pass through a 2 mm filter for color measurements as previously described. A separate portion of the resultant solid is placed between to sheets of metal, melt-pressed to a thickness typically 7 mil (thousandths of an inch), quenched to an amorphous film for light absorption measurements as previously described. The weight average molecular weight is greater than 21,000 and the ABS/L is less than 6.1.

Example 9 Preparation of Poly(butylene terephthalate)

Oligo(butylene terephthalate) is prepared by esterifying terephthalic acid and butylene glycol without a catalyst to a number average degree of polymerization of about 16. A 1-liter resin kettle is provided with a Jiffy Mixer agitator rotating at 60 rpm, a thermocouple, condenser and nitrogen sweep. To this kettle is added 400 grams of oligo(butylene terephthalate), 115 ml of butylene glycol and then an organic titanate-ligand catalyst system. The agitator is turned on and the temperature is increased to 275° C. over a period of 45 minutes. The contents are polymerized by holding under agitation at 275° C. and a pressure of 120 torr for 20 minutes, and at 275° C. and a pressure of 30 torr for an additional 20 minutes. The contents are then held under agitation at 275° C. and a pressure of 0.5 torr for a time sufficient to reach 15 oz-in (ounce-inches) torque as measured by an Electro-Craft Motomactic torque controller. The time in minutes for this step is recorded as the Finish Time and varies with the catalyst used. The polymer melt is then poured into a water bath to solidify the melt. A portion of the resultant solid is annealed at 160° C. for 16 hours and ground to pass through a 2 mm filter for color measurements as previously described. A separate portion of the resultant solid is placed between to sheets of metal, melt-pressed to a thickness typically 7 mil (thousandths of an inch), quenched to an amorphous film for light absorption measurements as previously described. The weight average molecular weight is greater than 21,000 and the ABS/L is less than 6.1.

Example 10 Preparation of Poly(propylene naphthalate)

Oligo(propylene naphthalate) is prepared by esterifying 2,6-naphthoic acid and 1,3-propylene glycol without a catalyst to a number average degree of polymerization of about 16. A 1-liter resin kettle is provided with a Jiffy Mixer agitator rotating at 60 rpm, a thermocouple, condenser and nitrogen sweep. To this kettle is added 400 grams of oligo (propylene naphthalate), 115 ml of propylene glycol and then an organic titanate-ligand catalyst system. The agitator is turned on and the temperature is increased to 255° C. over a period of 45 minutes. The contents are polymerized by holding under agitation at 255° C. and a pressure of 120 torr for 20 minutes, and at 255° C. and a pressure of 30 torr for an additional 20 minutes. The contents are then held under agitation at 255° C. and a pressure of 0.5 torr for a time sufficient to reach 15 oz-in (ounce-inches) torque as measured by an Electro-Craft Motomactic torque controller. The time in minutes for this step is recorded as the Finish Time and varies with the catalyst used. The polymer melt is then poured into a water bath to solidify the melt. A portion of the resultant solid is annealed at 160° C. for 16 hours and ground to pass through a 2 mm filter for color measurements as previously described. A separate portion of the resultant solid is placed between to sheets of metal, melt-pressed to a thickness typically 7 mil (thousandths of an inch), quenched to an amorphous film for light absorption measurements as previously described. The weight average molecular weight is greater than 21,000 and the ABS/L is less than 6.1.

Example 11 Preparation of Poly(ethylene naphthalate)

Oligo(ethylene naphthalate) is prepared by esterifying 2,6-naphthoic acid and ethylene glycol without a catalyst to a number average degree of polymerization of about 16. A 1-liter resin kettle is provided with a Jiffy Mixer agitator rotating at 60 rpm, a thermocouple, condenser and nitrogen sweep. To this kettle is added 400 grams of oligo(ethylene naphthalate), 115 ml of ethylene glycol and then an organic titanate-ligand catalyst system. The agitator is turned on and the temperature is increased to 275° C. over a period of 45 minutes. The contents are polymerized by holding under agitation at 275° C. and a pressure of 120 torr for 20 minutes, and at 275° C. and a pressure of 30 torr for an additional 20 minutes. The contents are then held under agitation at 275° C. and a pressure of 0.5 torr for a time sufficient to reach 15 oz-in (ounce-inches) torque as measured by an Electro-Craft Motomactic torque controller. The time in minutes for this step is recorded as the Finish Time and varies with the catalyst used. The polymer melt is then poured into a water bath to solidify the melt. A portion of the resultant solid is annealed at 160° C. for 16 hours and ground to pass through a 2 mm filter for color measurements as previously described. A separate portion of the resultant solid is placed between to sheets of metal, melt-pressed to a thickness typically 7 mil (thousandths of an inch), quenched to an amorphous film for light absorption measurements as previously described. The weight average molecular weight is greater than 21,000 and the ABS/L is less than 6.1.

Example 12 Preparation of Poly(ethylene isophthalate)

Oligo(ethylene isophthalate) is prepared by esterifying isophthalic acid and ethylene glycol without a catalyst to a number average degree of polymerization of about 16. A 1-liter resin kettle is provided with a Jiffy Mixer agitator rotating at 60 rpm, a thermocouple, condenser and nitrogen sweep. To this kettle is added 400 grams of oligo(ethylene isophthalate), 115 ml of ethylene glycol and then an organic titanate-ligand catalyst system. The agitator is turned on and the temperature is increased to 275° C. over a period of 45 minutes. The contents are polymerized by holding under agitation at 275° C. and a pressure of 120 torr for 20 minutes, and at 275° C. and a pressure of 30 torr for an additional 20 minutes. The contents are then held under agitation at 275° C. and a pressure of 0.5 torr for a time sufficient to reach 15 oz-in (ounce-inches) torque as measured by an Electro-Craft Motomactic torque controller. The time in minutes for this step is recorded as the Finish Time and varies with the catalyst used. The polymer melt is then poured into a water bath to solidify the melt. A portion of the resultant solid is annealed at 160° C. for 16 hours and ground to pass through a 2 mm filter for color measurements as previously described. A separate portion of the resultant solid is placed between to sheets of metal, melt-pressed to a thickness typically 7 mil (thousandths of an inch), quenched to an amorphous film for light absorption measurements as previously described. The weight average molecular weight is greater than 21,000 and the ABS/L is less than 6.1.

Example 13 Preparation of Poly(propylene isophthalate)

Oligo(propylene isophthalate) is prepared by esterifying isophthalic acid and 1,3-propylene glycol without a catalyst to a number average degree of polymerization of about 16. A 1-liter resin kettle is provided with a Jify Mixer agitator rotating at 60 rpm, a thermocouple, condenser and nitrogen sweep. To this kettle is added 400 grams of oligo(propylene isophthalate), 115 ml of propylene glycol and then an organic titanate-ligand catalyst system. The agitator is turned on and the temperature is increased to 275° C. over a period of 45 minutes. The contents are polymerized by holding under agitation at 275° C. and a pressure of 120 torr for 20 minutes, and at 275° C. and a pressure of 30 torr for an additional 20 minutes. The contents are then held under agitation at 275° C. and a pressure of 0.5 torr for a time sufficient to reach 15 oz-in (ounce-inches) torque as measured by an Electro-Craft Motomactic torque controller. The time in minutes for this step is recorded as the Finish Time and varies with the catalyst used. The polymer melt is then poured into a water bath to solidify the melt. A portion of the resultant solid is annealed at 160° C. for 16 hours and ground to pass through a 2 mm filter for color measurements as previously described. A separate portion of the resultant solid is placed between to sheets of metal, melt-pressed to a thickness typically 7 mil (thousandths of an inch), quenched to an amorphous film for light absorption measurements as previously described. The weight average molecular weight is greater than 21,000 and the ABS/L is less than 6.1.

Example 14 Preparation of Poly(ethylene-co-propylene terephthalate) Oligo(ethylene terephthalate) is prepared by esterifying terephthalic acid and ethylene glycol without a catalyst to a number average degree of polymerization of about 16. A 1-liter resin kettle is provided with a Jiffy Mixer agitator rotating at 60 rpm, a thermocouple, condenser and nitrogen sweep. To this kettle is added 400 grams of oligo (ethylene terephthalate), 115 ml of propylene glycol and then an organic titanate-ligand catalyst system. The agitator is turned on and the temperature is increased to 255° C. over a period of 45 minutes. The contents are polymerized by holding under agitation at 255° C. and a pressure of 120 torr for 20 minutes, and at 255° C. and a pressure of 30 torr for an additional 20 minutes. The contents are then held under agitation at 255° C. and a pressure of 0.5 torr for a time sufficient to reach 15 oz-in (ounce-inches) torque as measured by an Electro-Craft Motomactic torque controller. The time in minutes for this step is recorded as the Finish Time and varies with the catalyst used. The polymer melt is then poured into a water bath to solidify the melt. A portion of the resultant solid is annealed at 160° C. for 16 hours and ground to pass through a 2 mm filter for color measurements as previously described. A separate portion of the resultant solid is placed between to sheets of metal, melt-pressed to a thickness typically 7 mil (thousandths of an inch), quenched to an amorphous film for light absorption measurements as previously described. The weight average molecular weight is greater than 21,000 and the ABS/L is less than 6.1.

Example 15 Preparation of Poly(ethylene-co-propylene naphthalate)

Oligo(ethylene naphthalate) is prepared by esterifying naphthalic acid and ethylene glycol without a catalyst to a number average degree of polymerization of about 16. A 1-liter resin kettle is provided with a Jiffy Mixer agitator rotating at 60 rpm, a thermocouple, condenser and nitrogen sweep. To this kettle is added 400 grams of oligo(ethylene naphthalate), 115 ml of propylene glycol and then an organic titanate-ligand catalyst system. The agitator is turned on and the temperature is increased to 255° C. over a period of 45 minutes. The contents are polymerized by holding under agitation at 255° C. and a pressure of 120 torr for 20 minutes, and at 255° C. and a pressure of 30 torr for an additional 20 minutes. The contents are then held under agitation at 255° C. and a pressure of 0.5 torr for a time sufficient to reach 15 oz-in (ounce-inches) torque as measured by an Electro-Craft Motomactic torque controller. The time in minutes for this step is recorded as the Finish Time and varies with the catalyst used. The polymer melt is then poured into a water bath to solidify the melt. A portion of the resultant solid is annealed at 160° C. for 16 hours and ground to pass through a 2 mm filter for color measurements as previously described. A separate portion of the resultant solid is placed between two sheets of metal, melt-pressed to a thickness typically 7 mil (thousandths of an inch), quenched to an amorphous film for light absorption measurements as previously described. The weight average molecular weight is greater than 21,000 and the ABS/L is less than 6.1.

What is claimed is:

1. Poly(ethylene terephthalate) having a weight average molecular weight of at least about 21,000 and containing between 0.5 to 500 ppm titanium catalyst residue, said polyethylene terephthalate having an ABS/L value less than 7, a Hunter L greater than 65, a Hunter a value between −2 and +2, and a Hunter b value between −2 and 6.

2. The poly(ethylene terephthalate) of claim 1 wherein said catalyst residue is of a catalyst system prepared by adding an organic titanate having the formula Ti(OR)$_4$ wherein each R is an alkyl group having up to 12 carbon atoms, an organic phosphonic or phosphinic acid, and an organic ortho silicate or zirconate, to ethylene glycol.

3. The poly(ethylene terephthalate) of claim 2 wherein the concentration of the organic titanate, organic phosphonic or phosphinic acid, and organic ortho silicate or zirconate mixture in the glycol is at least 5%, by weight.

4. The poly(ethylene terephthalate) of claim 3 wherein the molar ratios of titanium, phosphorus, and zirconium are P:Ti, 1:1 to 4:1, Zr:Ti, 1:1 to 4:1; Zr, greater or equal to 0.5:1.

5. The poly(ethylene terephthalate) of claim 2, 3 or 4 wherein the organic titanate is tetraisopropyl titanate, tetra-n-butyl titanate, or mixtures thereof.

6. The poly(ethylene terephthalate) of claim 2, 3 or 4 wherein a tetraalkyl ortho zirconate is added to the ethylene glycol.

7. The poly(ethylene terephthalate) of claim 2, 3 or 4 wherein phenyl phosphinic acid, and a tetraalkyl ortho zirconate are added to the ethylene glycol.

8. A poly(alkylene arylate) polymer having a weight average molecular weight of at least 21,000, containing about 0.1 to 500 ppm titanium residue from an organic titanate-ligand catalyst system, and having an ABS/L value less than or equal to 6.0.

9. The poly(alkylene arylate) polymer of claim 8 wherein said poly(alkylene arylate) polymer has an ABS/L value less than or equal to 6.1, a Hunter L greater than 65, a Hunter a value between −2 and +2, and a Hunter b value between −2 and 6.0.

10. The poly(alkylene arylate) polymer of claim 8 wherein said poly(alkylene arylate) polymer has an ABS/L value less than or equal to 5.0.

11. The poly(alkylene arylate) polymer of claim 8 wherein said poly(alkylene arylate) has an ABS/L value less than or equal to 4.0.

12. A poly(alkylene arylate) polymer having a weight average molecular weight of at least about 21,000 containing about 0.5 to 500 ppm titanium residue from an organic titanate-ligand catalyst solution, said poly(alkylene arylate) having an ABS/L value less than 6.1, a Hunter L greater than 65, a Hunter a value between −2 and +2, and a Hunter b value between −2 and 8.3.

13. The poly(alkylene arylate) polymer of claims 8, 9, 10, 11, or 12 wherein said poly(alkylene arylate) polymer is selected from the group consisting of poly(ethylene terephthalate), poly(propylene terephthalate), poly(butylene terephthalate), poly(ethylene naphthalate), poly(propylene napthalate), poly(butylene naphthalate), poly(ethylene isophthalate), poly(propylene isophthalate), poly(butylene isophthalate), and combinations of two or more thereof.

14. The poly(alkylene arylate) polymer of claim 13 wherein said poly(alkylene arylate) polymer is a poly (ethylene terephthalate) homopolymer or copolymer.

15. The poly(alkylene arylate) polymer of claim 13 wherein said poly(alkylene arylate) polymer is apoly (propylene terephthalate) homopolymer or copolymer.

16. The poly(alkylene arylate) polymer of claim 13 wherein said poly(alkylene arylate) polymer is poly (butylene terephthalate) homopolymer or copolymer.

17. The poly(alkylene arylate) polymer of claim 13 wherein said poly(alkylene arylate) polymer is apoly (ethylene naphthalate) homopolymer or copolymer.

18. The poly(alkylene arylate) polymer of claim 13 wherein said poly(alkylene arylate) polymer is a poly (propylene naphthalate) homopolymer or copolymer.

19. The poly(alkylene arylate) polymer of claim 13 wherein said poly(alkylene arylate) polymer is a poly (butylene naphthalate) homopolymer or copolymer.

20. The poly(alkylene arylate) polymer of claim 13 wherein said poly(alkylene arylate) polymer is a poly (ethylene isophthalate) homopolymer or copolymer.

21. The poly(alkylene arylate) polymer of claim 13 wherein said poly(alkylene arylate) polymer is a poly (propylene isophthalate) homopolymer or copolymer.

22. The poly(alkylene arylate) polymer of claim 13 wherein said poly(alkylene arylate) polymer is a poly (butylene isophthalate) homopolymer or copolymer.

* * * * *

UNITED STATES PATENT AND TRADEMARK OFFICE
CERTIFICATE OF CORRECTION

PATENT NO. : 5,981,690

DATED : November 9, 1999

INVENTOR(S) : Steven Raymond Lustig, et al.

It is certified that error appears in the above-identified patent and that said Letters Patent is hereby corrected as shown below:

Column 6, lines 9 and 10, delete "mils, or thousandths of an inch" and insert --centimeters--.

Signed and Sealed this

Sixteenth Day of May, 2000

Attest:

Q. TODD DICKINSON

Attesting Officer

Director of Patents and Trademarks